United States Patent [19]
Lohr, Jr. et al.

[11] 3,883,460
[45] May 13, 1975

[54] STABILIZATION OF POLYBUTADIENE RESIN

[75] Inventors: Delmar F. Lohr, Jr.; Edward Leo Kay, both of Akron, Ohio

[73] Assignee: The Firestone Tire & Rubber Company, Akron, Ohio

[22] Filed: Apr. 16, 1973

[21] Appl. No.: 351,693

[52] U.S. Cl. .................. 260/23.7 R; 260/23.7 M; 260/45.75 W
[51] Int. Cl. .................................. C08d 11/04
[58] Field of Search ... 260/23.7 R, 23.7 M, 457.5 R

[56] References Cited
UNITED STATES PATENTS

| | | | |
|---|---|---|---|
| 2,797,238 | 6/1957 | Miller et al. | 260/429.9 |
| 3,083,175 | 3/1963 | Safford et al. | 260/45.9 R |
| 3,293,208 | 12/1966 | Milionis et al. | 260/457.5 N |
| 3,658,637 | 4/1972 | Danielson | 260/23.7 M |

FOREIGN PATENTS OR APPLICATIONS

| | | | |
|---|---|---|---|
| 1,227,162 | 4/1971 | United Kingdom | 260/23.7 R |

*Primary Examiner*—V. P. Hoke

[57] ABSTRACT

The incorporation of a Group II B metal salt of a diarylphosphinodithioate into a polybutadiene resin greatly enhances the resistance thereof to thermo-oxidative deterioration.

4 Claims, No Drawings

STABILIZATION OF POLYBUTADIENE RESIN

FIELD OF THE INVENTION

This invention relates to butadiene polymer and copolymer resins, and more particularly to increasing the resistance of such resins to thermo-oxidative deterioration of the mechanical properties.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

| | Parts by Weight |
|---|---|
| Polybutadiene resin | 100 |
| Group II B Metal salt of a diarylphosphinodithioate | 0.5–5.0 |
| A metal soap | 0.5–5.0 |
| The composition being cured by heating with presence of: | |
| A peroxide curing agent | 0.5–6.0 |

The above ingredients are, of course, exclusive of other filling, reinforcing and compounding ingredients such as glass fiber, glass fabric, asbestos, flames resisters, and the like.

DESCRIPTION OF THE PREFERRED EMBODIMENTS

The Polybutadiene Resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1000–200,000, so that they are of at least a flowable consistency. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than 4 minutes, and in some cases even within a few seconds. Cure times for more than 4 minutes usually provide no added advantage. Where fast cures are desired, it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

Metal Salt of Diarylphosphinodithioate

The diarylphosphinodithioate salts of Group II B metals may be represented by the following formula:

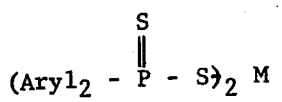

in which Aryl is phenyl or another hydrocarbon aryl group and M is zinc or another metal of Group II B of the Periodic table. Zinc salts are preferred.

The preferred aryl groups are phenyl and naphthyl, although salts of diarylphosphinodithioic acid containing substituted phenyl groups may be used as stabilizers for the polybutadiene resin as herein defined.

The substituent on the phenyl group may contain from one to about sixteen carbon atoms. The carbon atoms may be arranged in a straight chain configuration or branched. The carbon atoms may also be present in a cyclic configuration or as an additional phenyl group, as would be the case if biphenyl were used in the preparation of the phosphinodithioic acid.

The Cured Resins

The cured resins produced in accordance with this invention have exceptional resistance to thermo-oxidative deterioration of physical properties, particularly modulus and flexural strength upon long time exposure at high temperatures, i.e., temperatures above 400°F. and up to 700°F. Thus, the products, upon exposure to a temperature of 600°F. for 100 hours, will retain upwards of 80% of their modulus and upwards of 60% of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

|  | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium stearate | (per Table I) |
| Zinc diphenylphosphinodithioate | (per Table I) |

*90% of butadiene units in 1,2-configuration; molecular weight parameters $M_w$ = 29,000, $M_n$ = 23,000, DSV = 0.3.

A composition was made up in accordance with the above schedule, varying the calcium stearate and phosphinodithioate salt as indicated in the following table. In the case of each composition, the ingredients, in the proportions selected for that composition, were thoroughly mixed together, and the mixture poured into an evaporating dish to the depth of 0.5 inch. The dish was then placed in a vacuum oven, where the hexane was removed at 125°F. under a pressure of 1-5 mm. of mercury absolute. Each such dried composition was then removed and broken up, and molded in a compression mold into several test bars 1 × 3 × 0.1 inches. Temperature of molding was 350°F., total load on the die was 10-20 tons normal to the 1 × 3 inches face, and time was four minutes. The modulus and flexural strength was determined upon control bars from each composition, and the average recorded in the table.

The use of hexane in the mixture was a matter of convenience in preparing relatively small laboratory samples. On an industrial scale, hexane may be omitted as a matter of economics and the remaining components of the mixture dryblended by known commerical means.

TABLE I

STABILIZING EFFECT OF ZINC DIPHENYLPHOSPHINODITHIOATE
Forced-Air Oven Aging at 600°F., 100 Hours

| Test Specimen | Flexural Modulus psi ×10⁻⁶ | | | Flexural Strength, psi | | |
|---|---|---|---|---|---|---|
| | Unaged | Aged | % Retained | Unaged | Aged | % Retained |
| 1. Control, no Stabilizer | 1.31 | 0.12 | 9 | 11,100 | 1,100 | 10 |
| 2. Control plus 3.0 phr Calcium Stearate | 1.40 | 1.11 | 79 | 10,700 | 7,200 | 67 |
| 3. No. 2 plus 1.0 phr Stabilizer A | 1.53 | 1.50 | 98 | 12,100 | 9,600 | 79 |

Stabilizer A is zinc diphenylphosphinodithioate.

As shown by the data presented in Table I, the experimental stabilizer A which is zinc diphenylphosphinodithioate significantly increased both the unaged and aged flexural modulus and strength values of the test specimen relative to the unstabilized control (Test Specimen 1) and the control plus 3.0 phr of calcium stearate (Test Specimen 2). We have included the unstabilized control as a point of reference. Test specimen 2, which contained 3.0 phr of calcium stearate, was included because we have also determined that calcium stearate does effect some stabilization of the polybutadiene resins as herein defined.

The improvement in both unaged as well as aged flexural modulus and strength properties was unexpected. In addition, the relative percent retention of flexural modulus and strength of the test specimen containing zinc diphenylphosphinodithioate is significantly higher than the respective values for Test Specimens Nos. 1 and 2.

What is claimed is:

1. A composition curable to a hard resin having enhanced resistance to thermo-oxidative deterioration of its mechanical properties, said composition containing

|  | Parts by Weight |
| --- | --- |
| A butadiene polymer or copolymer resin | 100 |
| Zinc diarylphosphinodithioate | 0.5–5.0 |
| Calcium stearate | 0.5–5.0 |
| A peroxide curing agent | 0.5–6.0 |
| Silica | 100–500 |
| Vinyl triacetoxysilane | 0.05–5.0 | the resin being a homopolymer of butadiene or a copolymer of butadiene and styrene and containing at least 40% by weight of butadiene, and at least 80% of butadiene repeating units in the homopolymer or copolymer being in the 1,2-configuration, and having a molecular weight of 12,500 to 55,000; and the curing agent being a peroxide which gives radicals of the structure $R_2(CH_3)CO\cdot$ in which each R represents a hydrocarbon radical containing 1 to 20 carbon atoms.

2. The composition of claim 1 in which the curing agent is dicumyl peroxide.

3. A peroxide-cured resin highly resistant to thermo-oxidative deterioration of physical properties, said resin containing therein

|  | Parts by Weight |
| --- | --- |
| A butadiene polymer or copolymer resin | 100 |
| Zinc diarylphosphinodithioate | 0.5–5.0 |
| Calcium stearate | 0.5–5.0 |
| Silica | 100–500 |
| Vinyl triacetoxysilane | 0.05–5.0 | the resin being a homopolymer of butadiene or a copolymer of butadiene and styrene and containing at least 40% by weight of butadiene and having a molecular weight of 12,500 to 55,000, and at least 80% of butadiene repeating units in the homopolymer or copolymer being in the 1,2-configuration; and the curing agent being a peroxide which gives radicals of the structure $R_2(CH_3)CO\cdot$ in which each R represents a hydrocarbon containing 1 to 20 carbon atoms.

4. The composition of claim 3 cured with dicumyl peroxide.

* * * * *